United States Patent [19]
Wang

[11] Patent Number: 5,159,950
[45] Date of Patent: Nov. 3, 1992

[54] FOUNTAIN FAUCET
[76] Inventor: Wen-Chang Wang, No. 208-13, Shang Lun Tsun, Jen Te Hsiang,, Tainan Hsien
[21] Appl. No.: 871,507
[22] Filed: Apr. 21, 1992
[51] Int. Cl.⁵ ............... F16K 15/18; F16K 31/14; F16K 31/24
[52] U.S. Cl. .................... 137/390; 137/410; 137/448; 251/74; 251/82
[58] Field of Search ........... 137/181, 390, 409, 410, 137/420, 421, 434, 448; 251/73, 74, 82, 83

[56] References Cited
U.S. PATENT DOCUMENTS

| | | | |
|---|---|---|---|
| 1,336,288 | 4/1920 | Elliott | 137/390 |
| 1,407,800 | 2/1922 | Muzzy | 137/390 |
| 1,418,845 | 6/1922 | Stetson | 137/390 |
| 1,432,103 | 10/1922 | Feller | 137/390 |
| 1,719,837 | 7/1929 | Frisbie | 137/390 |
| 2,022,430 | 11/1935 | Nold | 137/390 |
| 2,091,228 | 8/1937 | Hann | 137/421 |
| 2,191,700 | 2/1940 | Stetson | 137/390 |
| 2,571,367 | 10/1951 | Judell | 137/390 |
| 3,796,227 | 3/1974 | Fujiwara | 137/390 |
| 4,335,734 | 6/1982 | Trinkwalder | 137/390 |

FOREIGN PATENT DOCUMENTS 608316  1/1935  Fed. Rep. of Germany ...... 137/390

Primary Examiner—George L. Walton
Attorney, Agent, or Firm—Bacon & Thomas

[57] ABSTRACT

A fountain faucet is comprised of a housing defining a water chamber and having an inlet communicating the water chamber and an outlet communicating the water chamber through an opening a float valve hinged within the water chamber for a swinging movement between valve open and valve closed positions. A control unit engaged in the housing by means of a thread operable to retain the float in its closed position or allow the float valve swingable freely between valve open and valve closed positions.

6 Claims, 3 Drawing Sheets

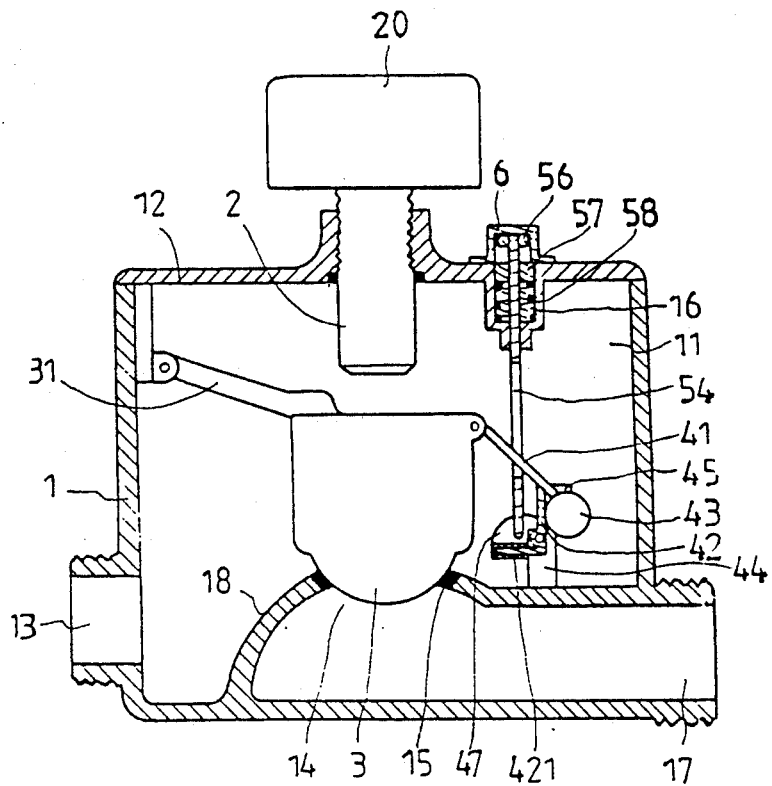
FIG. 6
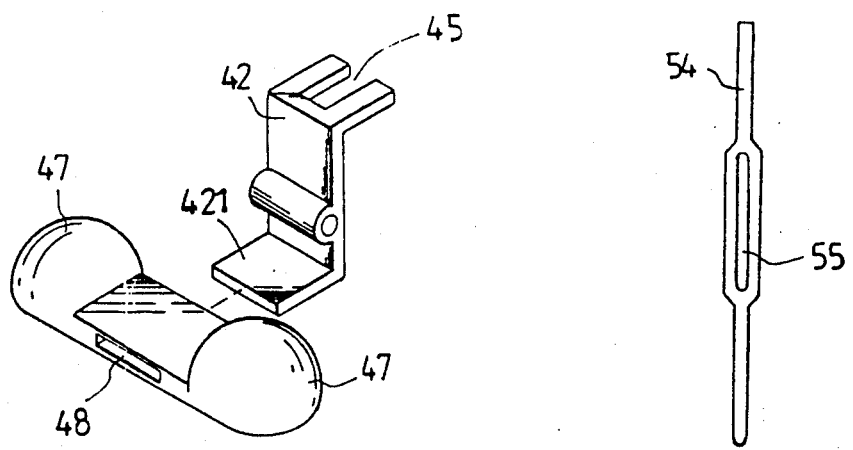
FIG. 7
FIG. 8

5,159,950

FOUNTAIN FAUCET

BACKGROUND OF THE INVENTION

The present invention relates to a fountain faucet and more particularly to a fountain faucet having a float valve which automatically shuts off the fountain faucet to prevent water from running waste.

Nowadays, fountain faucets are provided for controlling water flow of water pipes. Sometimes fountain faucets may be left open when water supply is shut off. Once the water supply is restored, water may keep running to waste until someone pays attention to it and turns the faucet off. It is therefore desirable to provide an effective means to automatically close a fountain faucet which is either left open or properly closed.

OBJECT OF THE INVENTION

Accordingly, it is a primary object of the present invention to provide a fountain faucet which overcomes the foregoing defect associated with the prior art.

Other objects of the invention will be apparent from the description and specifications hereinafter set forth.

DESCRIPTION OF THE DRAWINGS

FIG. 6 is a side elevation view of a fountain faucet of an alternative embodiment according to the present invention;

FIG. 7 is an enlarged perspective view of retainer to be used in the fountain faucet shown in FIG.7; and FIG. 8 is an enlarged elevation view of an actuating arm to be used in the fountain faucet shown in FIG. 6.

DESCRIPTION OF THE PREFERRED EMBODIMENTS

Figure 1:
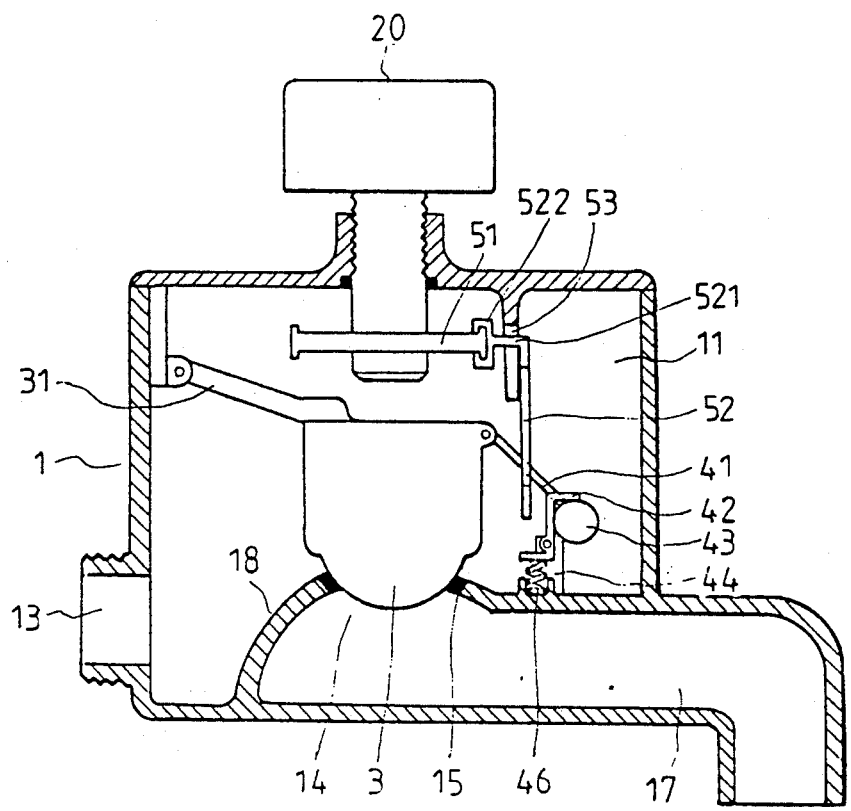
FIG. 1 is a side elevation view in section of a fountain faucet embodying the instant invention of which a float valve is located and further retained in a closed condition.

Referring to FIG. 1, a housing defines a water chamber 11, an inlet 13 communicating the water chamber 11 is formed in a side wall of the housing 1 and in communication with a water supply tube (not shown). An outlet tube 17 defined by a partition 18 and a bottom wall of the housing 1 is formed in a lower portion of the housing 1. An opening 14 in the partition 18 places the outlet tube 17 in communication with the water chamber 11. A valve seat 15 made of a resilient material such as rubber is mounted around the opening 14. A float valve 3 normally seats on the valve seat 15 to water tightly close the opening 14 and is connected at top to one end of an arm 31 of which the other end is hinged to an inner side wall of the housing 1.

An operating knob 20 is integrally mounted on top of a spindle 2 which is an ordinary part and well-known in construction to extend through the top wall 12 of the housing 1 and be threaded to move axially downwardly towards the float valve 3 seating on the valve seat 3.

Figures 2, 3:
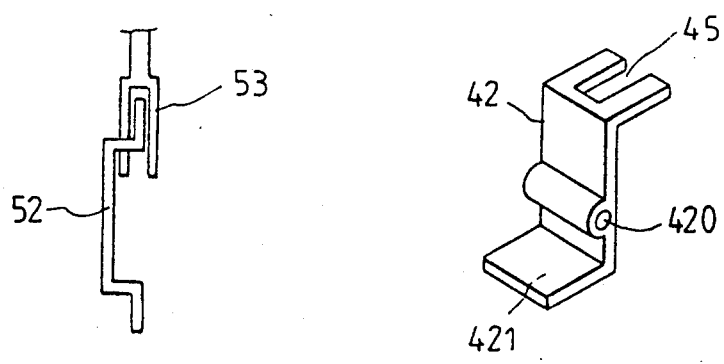
FIG. 2 is an elevation view of an actuating arm to be used in the fountain faucet.
FIG. 3 is an enlarged perspective view of a retainer for catching a float to be used in the fountain faucet.

A release device includes a disc 51 having an annular flange 510 and coaxially sleeved around the spindle 2, an actuating arm 52 extending vertically downwardly and having a horizontal portion 521 bent radially with respect to the spindle 2 and retained between brackets 53, as shown in FIG. 2, which extend downwardly from an interior of the top wall 12. The inner end of the horizontal portion 521 is terminated with a catcher 522 which loosely encloses the flange 510 of the disc 51 that allows the disc 51 to rotate with respect to the catcher 522. This arrangement allows the actuating arm 52 to move up and down along a vertical direction only in association with the spindle 2.

A valve retaining device includes a float 43 mounted to a rod 41 which is hinged to the top of the float valve 3, a retainer 42 fulcrumed, as at 420, on a stand 44 rising rigidly from the partition 18.

As shown in FIG. 3, the retainer 42 has brackets 45 on top for catching the float 43 and a tail 421 on bottom being located in the downward path of the actuating arm 52. The brackets 45 are biased against the float 43 by means of a spring 46 which is compressed between the tail 421 of the retainer 42 and the partition 18. As shown in FIG. 1, water supply is shut off and the float valve 3 is in a closed position such that the opening 14 do not communicate the water chamber 11 and the outlet tube 17 and the float valve 3 effectively prevent the flow of water through the faucet 1. The float valve 3 is further retained in this closed position by the retainer 42 catching the float 43. Even though that the operating knob 20 of the faucet 1 is left at its opening position, any water supply through the inlet 13 to the faucet 1 may still be shut off and no water may run to waste.

Figure 5:
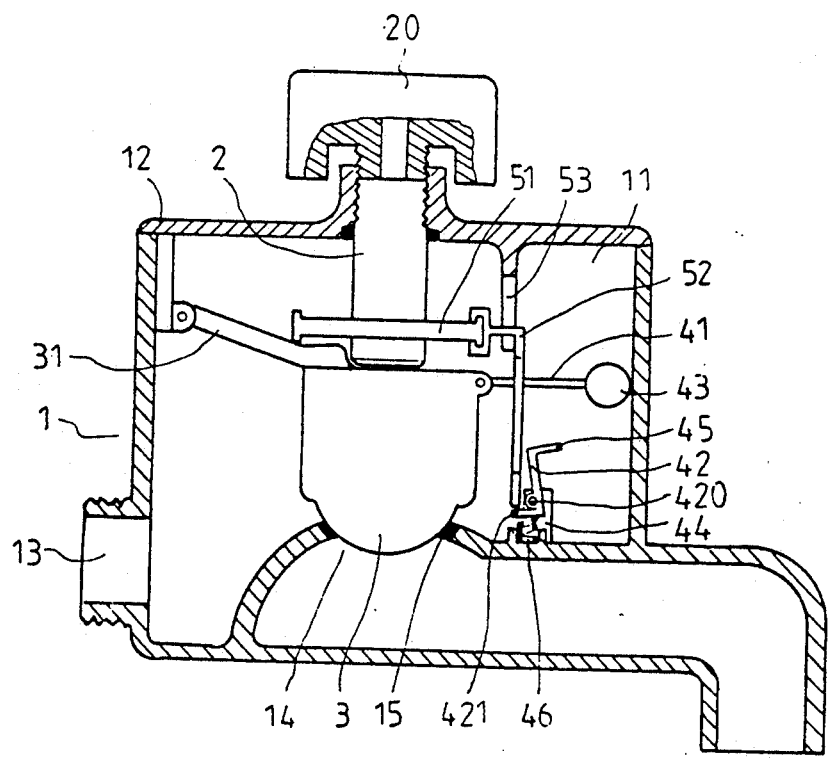
FIG. 5 is a side elevation view in section of the fountain faucet wherein the float valve is located in its closed position and the float is released from the retainer.

As shown in FIG. 5, the spindle 2 is in the closed position by threading the operating knob 20 whereas the actuating arm 52 is shifted downwardly to push the tail 421 of the retainer 42 rendering the retainer 42 to turn counterclockwise about the pivot 420 to release the float 43 from the brackets 45.

Figure 4:
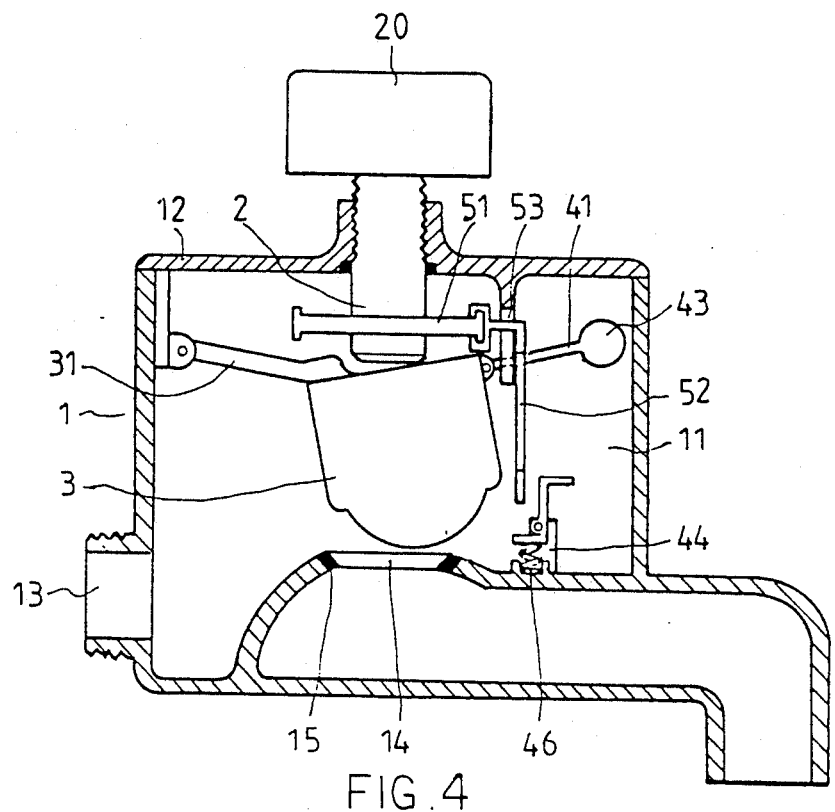
FIG. 4 is a side elevation view in section of the fountain faucet shown in FIG. 1 of wherein the float valve is located in its opening position.

An abutment stop (not shown) is formed on the hinge in the float valve 3 to limit swinging movement of the rod 41 in an extending position parallel to the flat top of the float valve 3, as shown in FIGS. 4 and 5. Although the float 43 rising with water in the water chamber 11, the float valve 3 is remained on the valve seat 15 by means of the spindle 2 which is now located in its closed position The faucet 1 with its float 43 released from the retainer 42, as shown in FIG. 5, can be operated to open simply by threading the operating knob 20 to retract the spindle 2 and the float valve 3 rises to lay open the opening 14 under the assistance of the float 43 and rod 41.

FIG.6 illustrates a second embodiment of a fountain faucet which is similar in construction to the first embodiment shown in FIG.1. A housing 1 defines a water chamber 11, an inlet 13 communicating the water chamber 11 is formed in a side wall of the housing 1 and in communication with a water supply tube not shown). An outlet tube 17 defined by a partition 18 and a bottom wall of the housing 1 is formed in a lower portion of the housing 1. An opening 14 in the partition 18 places the outlet tube 17 in communication with the water chamber 11. A valve seat 15 made of a resilient material such as rubber is mounted around the opening 14. A float valve 3 normally seats on the valve seat 15 to water tightly close the opening 14 and is connected at top to one end of an arm 31 of which the other end is hinged to an inner side wall of the housing 1. An operating knob 20 is integrally mounted on top of a spindle 2 to extend through the top wall 12 of the housing 1 and be threaded to move axially downwardly towards the float valve 3 seating on the valve seat 3. A valve retaining device includes a float 43 mounted to a rod 41 which is hinged to the top of the float valve 3, a retainer 42 fulcrumed on a stand 44 rising rigidly from the partition 18. The retainer 42 has brackets 45 on top for catching the float 43 and a tail 421 on bottom.

The difference between the second embodiment shown in FIG. 6 and the first embodiment shown in FIG. 1 mainly is the release device. The release device to be used in the second embodiment includes a recess 16 formed in the top wall 12 of the housing 1, an actuating arm 54 extending downwardly into the water chamber 11 with its lower end adjacent the tail 421 of the retainer and top end protruding slightly from the recess 16 and terminated with a head 56, a cap member 6 made of resilient material and mounted on the top wall 12 of the housing 1 to enclose the top end of the actuating arm 54 associated with the head 56, a piston-like member 57 securely sleeved around the actuating arm 54 and disposed within the recess 16 and a coil spring 58 mounted within the recess 16 underneath the piston-like member 57.

As shown in FIG. 8, a slot 55 is formed in the mid portion of the actuating arm 54 allowing extension there-through of the rod 41 which is limited to swing up and down only. As shown in FIG. 7, a buoyant member is provided to be mounted on the tail 421 of the retainer 42. Said buoyant member includes two spaced apart semi-spherical buoyant bodies 47 interconnected by a board which is transversely formed with hole 48 adapted to fittedly receive the tail 421 of the retainer. The buoyant member thus mounted to the tail 421 of the retainer 42 locates the board thereof in the down path of the actuating arm 54. When the water chamber 11 is filled with water, the buoyant member reinforces the retainer 42 in catching the float 43.

The float 43 of the second embodiment can be released by pushing the cap 6 with a thumb to move the actuating arm 54 downwardly and turn the retainer 42 counterclockwise. Similarly, the faucet 1 with its float 43 thus released can be operated to open simply by threading the operating knob 20 to retract the spindle 2, the float valve 3 then is allowed to be raised by water to lay open the opening 14 under the assistance of the float 43 via the rod 41.

While the invention has been described with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims, which scope is to be accorded the broadest interpretation so as to encompass all such modifications and equivalent structure.

What I claim is:

1. A fountain faucet for automatically shutting off the water flow from a pipe comprising a housing defining a water chamber and having an inlet communicating the water chamber, an outlet communicating the water chamber through an opening, a buoyant closure member disposed in the water chamber and hinged at a first side thereof for a swinging movement between a closed position where flow through the opening to the outlet is blocked and an open position where the water chamber is in communication with the outlet, a float-rod having a first end mounted with a float and a second end hinged to a second side of the buoyant closure member opposite to the first side thereof to swing the float between a first position where the float and float-rod locate substantially parallel to a top of the buoyant closure member and a second position below the first position, a retaining means having a bracket member adapted to catch and hold at least a portion of the float in its second position, a coil spring biasing the retaining means along a rotating direction to catch and hold said at least a portion of the float in its second position, with its bracket member, a control member operably movable between a first position to engage and retain the buoyant closure member in its closed position and a second position allowing the buoyant closure member to swing freely between its closed and open positions when the control member is out of engagement with said closure member and an actuating device shifting in combination with the movement of the control member to overcome the biasing force of the coil spring and turn the retaining means to release the float when the control member is in its first position and allowing the float to rise within the water chamber as the water level rise therein and maintain the closure member in its closed position.

2. A fountain faucet as claimed in claim 1, wherein a valve seat made of a resilient material is provided around the opening communicating the water chamber and the outlet for a water-tight closure between the buoyant closure member and the opening.

3. A fountain faucet as claimed in claim 1 wherein the control member is threadingly engaged in a top wall of the housing and threaded to move between its first and second positions.

4. A fountain faucet as claimed in claim 3 wherein the actuating device includes a disc member disposed in the water chamber and rigidly sleeved around the control member, a flange member integrally formed around the disc member, a catcher enclosing the flange member, an actuating rod extending downwardly from the catcher and having a leading end adjacent the retainer and a bracket member disposed in the water chamber and confining the catcher in association with the actuating rod to move along a vertical direction only.

5. A fountain faucet for automatically shutting off the water flow from a pipe comprising a housing defining a water chamber and having an inlet communicating the water chamber, an outlet communicating the water chamber through an opening, a buoyant closure member disposed in the water chamber and hinged at a first side thereof for a swinging movement between a closed position where flow through the opening to the outlet is blocked and an open position where the water chamber is in communication with the outlet, a float-rod having a first end mounted with a float and a second end hinged to a second side of the buoyant closure member opposite to the first side thereof to swing the float between a first position where the float and float-rod locate substantially parallel to a top of the buoyant closure member and a second position below the first position, a retaining means having a bracket member adapted to catch and hold at least a portion of the float in its second position, a control member operably movable between a first position to engage and retain the buoyant closure member in its closed position and a second position allowing the buoyant closure member to swing freely between its closed and open positions when the control member is out of engagement with said closure member and an actuating device including a recess formed in the top wall of the housing, an actuating rod extending downwardly through the recess into the water chamber with a leading end adjacent the retaining member, a piston-like member disposed within the recess and rigidly sleeved around the actuating rod, a coil spring disposed in the recess and mounted around the actuating rod underneath the piston-like member and a cap enclosing the recess for pushing the actuating rod downwardly to turn the retaining member along a direction to release, the float when the control member is in its first position and allowing the float to rise within the water chamber as the water level rise therein and maintain the closure member in its closed position.

6. A fountain faucet as claimed in claim 5 wherein a buoyant member is provided for enhancing holding force of the retaining member, said buoyant member includes two spaced-apart buoyant bodies interconnected with a board mounted to the retaining member.

* * * * *